SWITCHING MATRIX EMPLOYING TRANSISTORS

Filed Sept. 29, 1960 4 Sheets-Sheet 1

INVENTOR
ROBERT W. ROCHELLE
BY Glenn S. Orcvik Agent
Richard C. Reed
ATTORNEY

SWITCHING MATRIX EMPLOYING TRANSISTORS

Filed Sept. 29, 1960

INVENTOR

ROBERT W. ROCHELLE

BY Glenn S Orcevik Agent
Richard C Reed

ATTORNEY.

INVENTOR

ROBERT W. ROCHELLE

BY Glenn S. Ovcevik
Richard C. Reed Agent

ATTORNEY

INVENTOR

ROBERT W. ROCHELLE

BY Glenn S. Orwick, Agent
Richard C. Reed

ATTORNEY 3,012,235

SWITCHING MATRIX EMPLOYING TRANSISTORS

Robert W. Rochelle, Fairfax County, Va.

Original application Jan. 21, 1958, Ser. No. 710,374, now Patent No. 2,970,301, dated Jan. 31, 1961. Divided and this application Sept. 29, 1960, Ser. No. 59,465
4 Claims. (Cl. 340—208)
(Granted under Title 35, U.S. Code (1952), sec. 266)

The invention described herein may be manufactured and used by or for the Government of the United States of America for governmental purposes without the payment of any royalties thereon or therefor.

The present invention relates in general to switching devices and more particularly to means for controlling the on-off condition of a plurality of electrical circuits in selected order.

This is a division of my copending application Ser. No. 710,374 entitled Telemetereing Systems, which was fiied January 21, 1958, now U.S. Patent 2,970,301, dated Jan. 31, 1961.

It is frequently necessary in telecommunications systems of the type described in the above mentioned application and in other systems, as well, to employ a limited number of variables for the transmission of information from a greater number of information sources. In such instances a wide variety of mechanical, electrical, or electromechanical timing devices may be employed to accomplish the sequential switching which is in most cases necessarily involved. Not all the prior art switching means are suitable for continuous duty operations whereby a group of information from a large number of information sources is repeatedly sampled in selected order. Those switching means which might be suitable for such operations are often heavy, large size devices which must be serviced at regular intervals to maintain continuous duty operation. There are of course numerous applications where size, weight, power requirements and maintenance accessibility are limiting factors which must be considered in the selection of all component parts to be used. For example, in unmanned artificial satallite applications where size, weight, and current drain must be minimized, and there is no accessability for servicing.

Accordingly, it is an object of this invention to provide a switching matrix with minimum power supply requirements.

Another object of this invention is to provide a switching matrix composed of a minimum number of components.

Still another object of this invention is to provide a switching matrix which is reliable and will operate over an extended period of time without servicing.

A further object of this invention is to provide a switching matrix which is relatively compact and lightweight.

Other objects of this invention will become apparent upon a more comprehensive understanding of the invention for which reference is now made to the following description taken in conjunction with the accompanying drawings in which.

Briefly, the switching matrix of this invention involves several binary stages and a commutator in which reversals in polarity across the output terminals of each of the binary stages affects the operational conditions of several groups of on-off devices which in turn control the on-off conditions of interrupter devices in each transducer circuit such that the transducers are operative in selected sequential order. In the preferred embodiment of this invention, transistors are employed as the abovesaid on-off and interrupter devices.

Figures 1, 2:
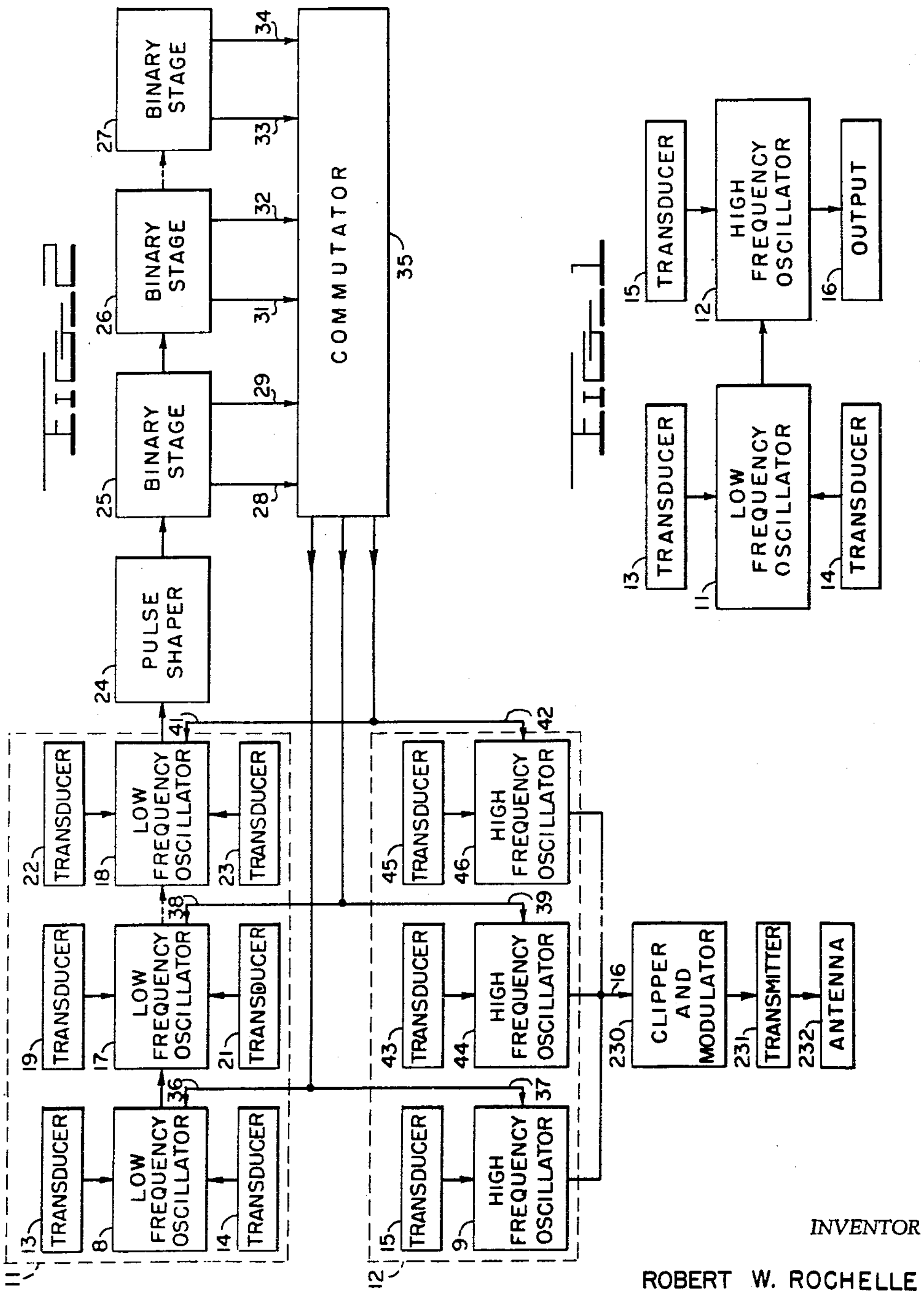
FIG. 1 is a block diagram of a typical three channel telemetering system.
FIG. 2 is a block diagram of a telemetering system of "N" channels, constructed in accordance with the principles of this invention.

Referring now to the drawings, wherein like reference characters designate like or corresponding parts throughout the several views, there is shown in FIG. 1 a low frequency oscillator 11 into which are fed the outputs of transducers 13 and 14. The output of low frequency oscillator 11 is fed into the high frequency oscillator 12 into which also is fed the output of transducer 15. The frequency of the high frequency oscillator is many times higher than the frequency of the low frequency oscillator, some twenty or thirty times for example. The output of the three channel system thus illustrated is derived at output 16.

FIG. 2 shows in block form a telemetering system of "N" channels which is constructed according to the same principles as the three channel system of FIG. 1. The basic low frequency oscillator 11 of FIG. 1 has three stages 8, 17 and 18 illustrated. Into these oscillator stages are fed the outputs of transducers 13, 14, 19, 21, 22 and 23. The output of the combined stages is fed through pulse shaper 24 into binary stages 25, 26 and 27. The outputs 28, 29, 31, 32, 33 and 34 of the binary stages are fed through a commutator 35 and leads 36, 37, 38, 39, 41 and 42 whereby selective sequential operation of the binary stages to one stage of the low frequency oscillater 11 and one stage of the high frequency oscillator 12 is effected. High frequency oscillator 12 is illustrated with three stages 9, 44 and 46 into which are fed the outputs of transducers 15, 43 and 46. The output of the high frequency oscillator stages which includes the output of the low frequency stages is fed through clipper and modulator 230, transmitter 231 and antenna 232.

Figures 3, 4, 7:
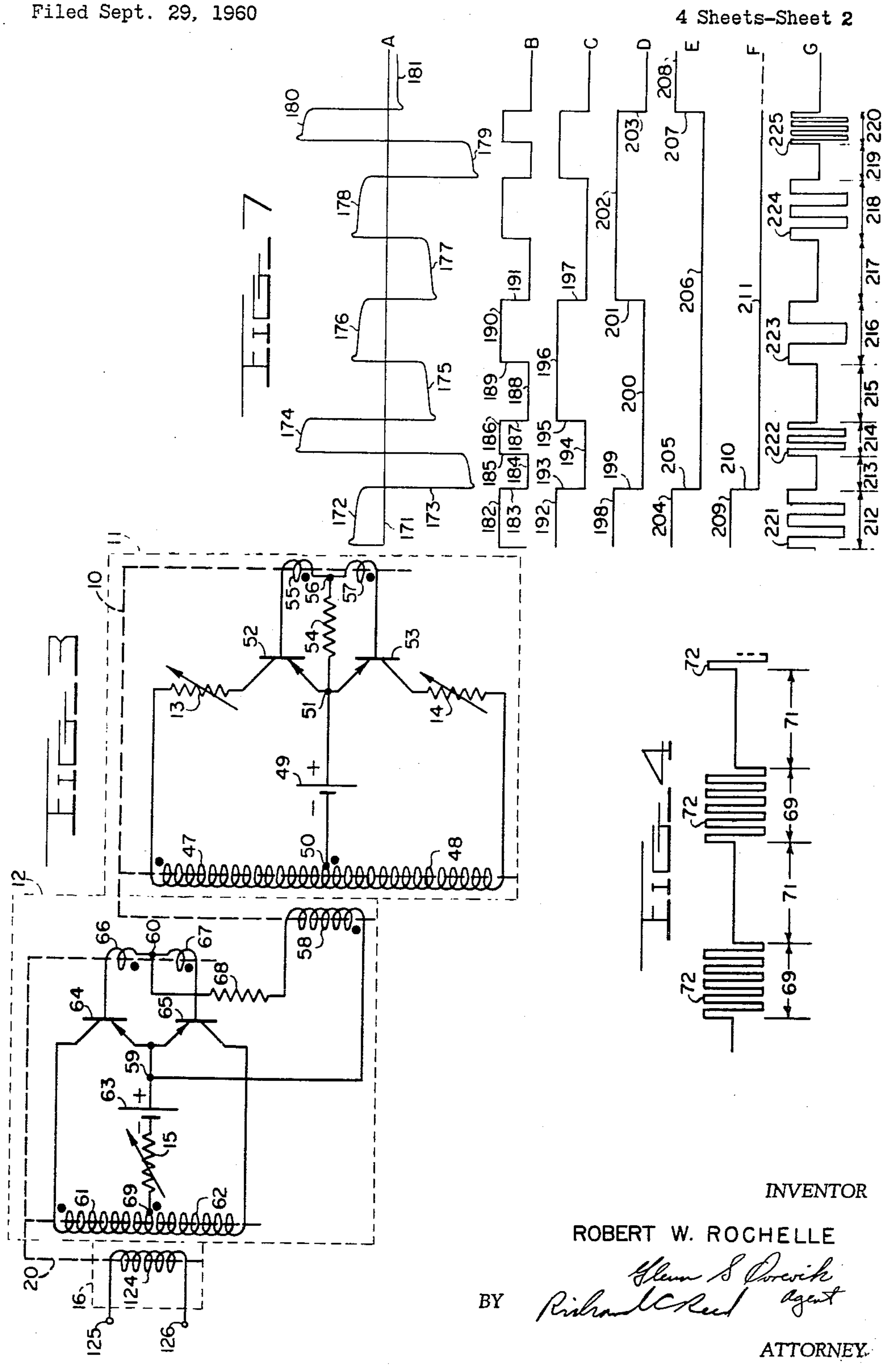
FIG. 3 is a schematic diagram of a three channel telemetering system constructed in accordance with the principles of this invention.
FIG. 4 is a representation of the output waveform of the three channel telemetering system of FIG. 3.
FIG. 7 is a representation of typical waveforms of a telemetering system constructed in accordance with the principles of this invention.

The telemetering system of FIG. 3 shows a low frequency oscillator 11 which includes a magnetic core 10 of square hysteresis loop material onto which are wound center tapped at 50 driving winding 47, 48, center tapped at 56 base winding 55, 57 and winding 58. A power source 49 is connected between center tap 50 and junction point 51 to which also are connected the emitters of p-n-p transistors 52 and 53, and junction point 56 through resistor 54. The bases of p-n-p transistors 52 and 53 are connected to the ends of base winding 55, 57. Transducer 13 is connected between the dotted end of driving winding 47, 48 and the collector of transistor 52. Transducer 14 is connected between the not-dotted end of control winding 47, 48 and the collector of transistor 53. FIG. 3 also shows a high frequency oscillator 12 which includes a magnetic core 20 of square hysteresis loop material onto which are wound center tapped at 69 driving winding 61, 62, center tapped at 60 base winding 66, 67 and output winding 124 with output terminals 125 and 126. The winding 58 is connected at its not-dotted end to center tap 60 of base winding 66, 67 through resistor 68 and at its dotted end to junction 59 to which are also connected the emitters of p-n-p transistors 64 and 65 and the positive side of power source 63. Transducer 15 shown as a variable resistor is connected between the center tap 69 of driving winding 61, 62 and negative side of power source 63. To the dotted end of winding 61 is connected the collector of transistor 64 and to the not-dotted end of winding 62 is connected the collector of transistor 65. With the base of transistor 64 connected to the not dotted end of base winding 66 and the base of transistor 65 connected to the dotted end of base winding 67, the circuit is complete.

Figure 5:
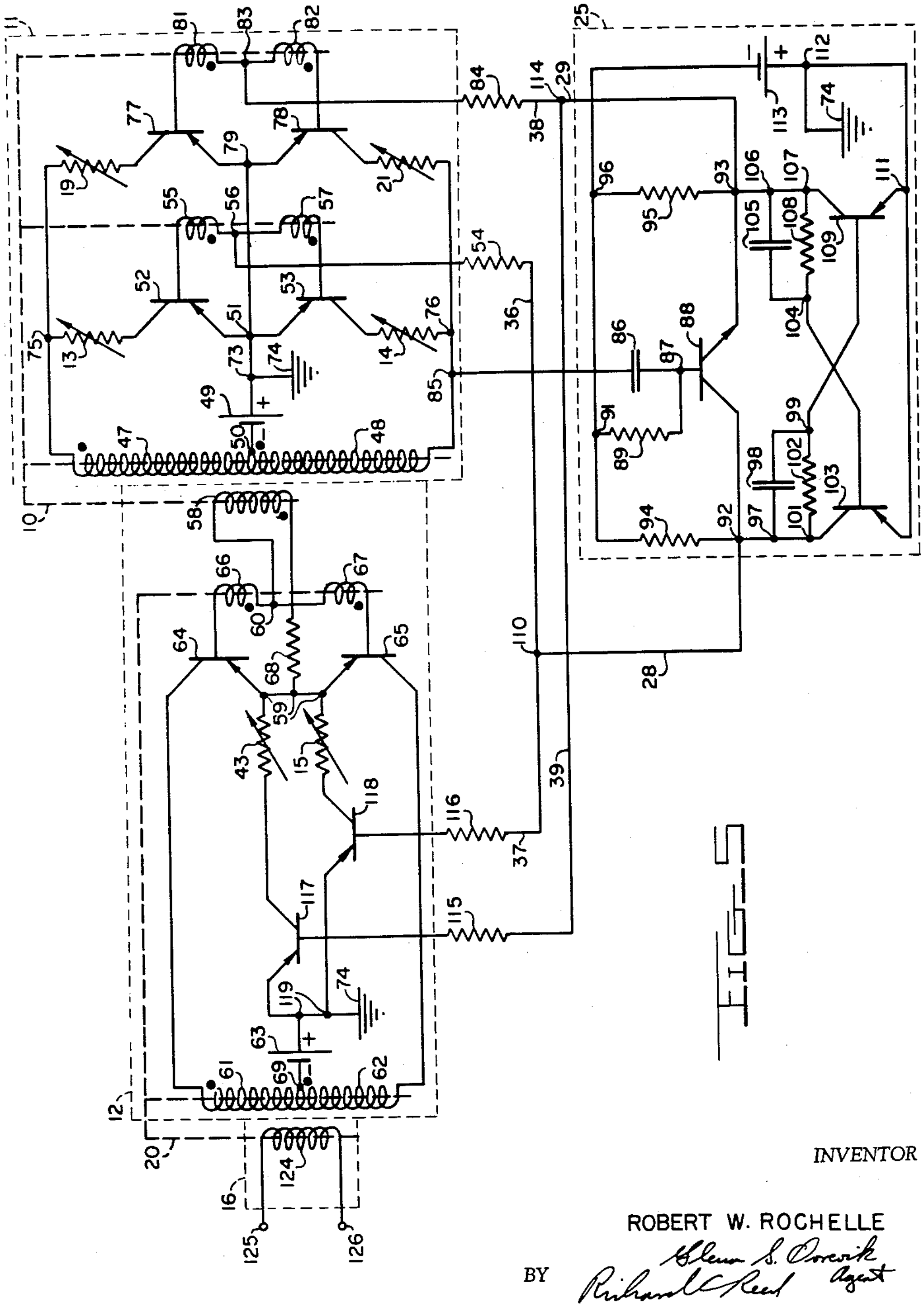
FIG. 5 is a schematic diagram of a six channel telemetering system constructed in accordance with the principles of this invention.

In FIG. 5, the basic structure of FIG. 3 is modified so that the telemetering system includes six channels instead of three. The modification includes the addition of a second stage to the low frequency oscillator 11 which includes transducers 19 and 21, p-n-p transistors 77 and 78 and base winding 81, 82 with its center tap 83 interconnected in the same manner as the identical structure of the first stage, and connected in parallel with the first stage across the ends of driving winding 47, 48. In order to provide for proper sequential operation, one side of each resistor 54 and resistor 84 is connected to the center taps 56 and 83 of the base windings 55, 57 and 81, 82 respectively, as found in the structure of FIG. 3. The other side of such resistors is connected not to junction 51, but to junctions 110 and 114, respectively.

The high frequency oscillator 12 of FIG. 5 differs from that of FIG. 3 in that an extra transducer 43 with its p-n-p transistor switch 117 is placed in circuit in parallel with transducer 15 with its p-n-p transistor switch 118.

Since the two oscillators are capable of encoding the output of transducers only during half cycles of operation, the maximum number of transducer outputs that can be encoded without a commutator is four, that is, one transducer during the positive half cycle of the low frequency oscillator with a second transducer effecting the simultaneous high frequency burst from the high frequency oscillator and a third transducer during the negative half cycle of the low frequency oscillator with a fourth transducer effecting the simultaneous high frequency burst from a second high frequency oscillator, not previously disclosed. (This second high frequency oscillator of similar construction as the disclosed high frequency oscillator could operate at a different frequency range from the frequency range of the first high frequency oscillator so that the combined outputs of the four transducers would be distinct and decodable. For practical purposes, it is preferred that the high frequency burst occur during only one of the half-cycles of the low frequency oscillator.) To handle more than three (or four) channels in the telemetering system, it is necessary to sequentially control the operation of the corresponding stages of the low and high frequency oscillators. Binary stage 25 in FIG. 5 is provided to accomplish just that.

Binary stage 25 as shown in the modification in FIG. 5 includes n-p-n transistor 88, the base of which is connected through junction 87, capacitor 86, and junction 85 to the not dotted end of control winding 47, 48 of the low frequency oscillator 11. The negative side of power source 113 is connected to junction 96 to which are connected junction 91 directly and junction 93 through resistor 95. To junction 91 are also connected junction 92 through resistor 94 and junction 87 through resistor 89. Connected to junction 92 are the collector of n-p-n transistor 88 and junction 97 and lead 28 which is connected to junction 110 to which are connected control leads 36 and 37. Lead 37 is connected to the base of transistor 118 through resistor 116. Lead 36 is connected to junction 56 through resistor 54. Junction 97 is connected to junction 99 through capacitor 98 and through junction 101 and resistor 102. The collector of p-n-p transistor 103 is connected to junction 101, its base to junction 104 and its emitter to junction 111 to which also is connected the emitter of p-n-p transistor 109. The base of transistor 109 is connected to junction 99 and the collector to junction 104 through resistor 108 and junction 107. Junctions 104 and 107 are also connected by capacitor 105 and junction 106. To junction 93 are connected also the emitter of transistor 88, junction 106, and junction 114 through lead 29. Junction 114 is connected to center tap 83 of base winding 81, 82 of the second stage of low frequency oscillator 11 through resistor 84 and lead 38, and junction 114 is connected to the base of p-n-p transistor 117 through resistor 115 and lead 39. To junction 112, the positive side of power source 113, common connection 74 and junction 111 are connected, thereby completing the structure.

Figure 6:
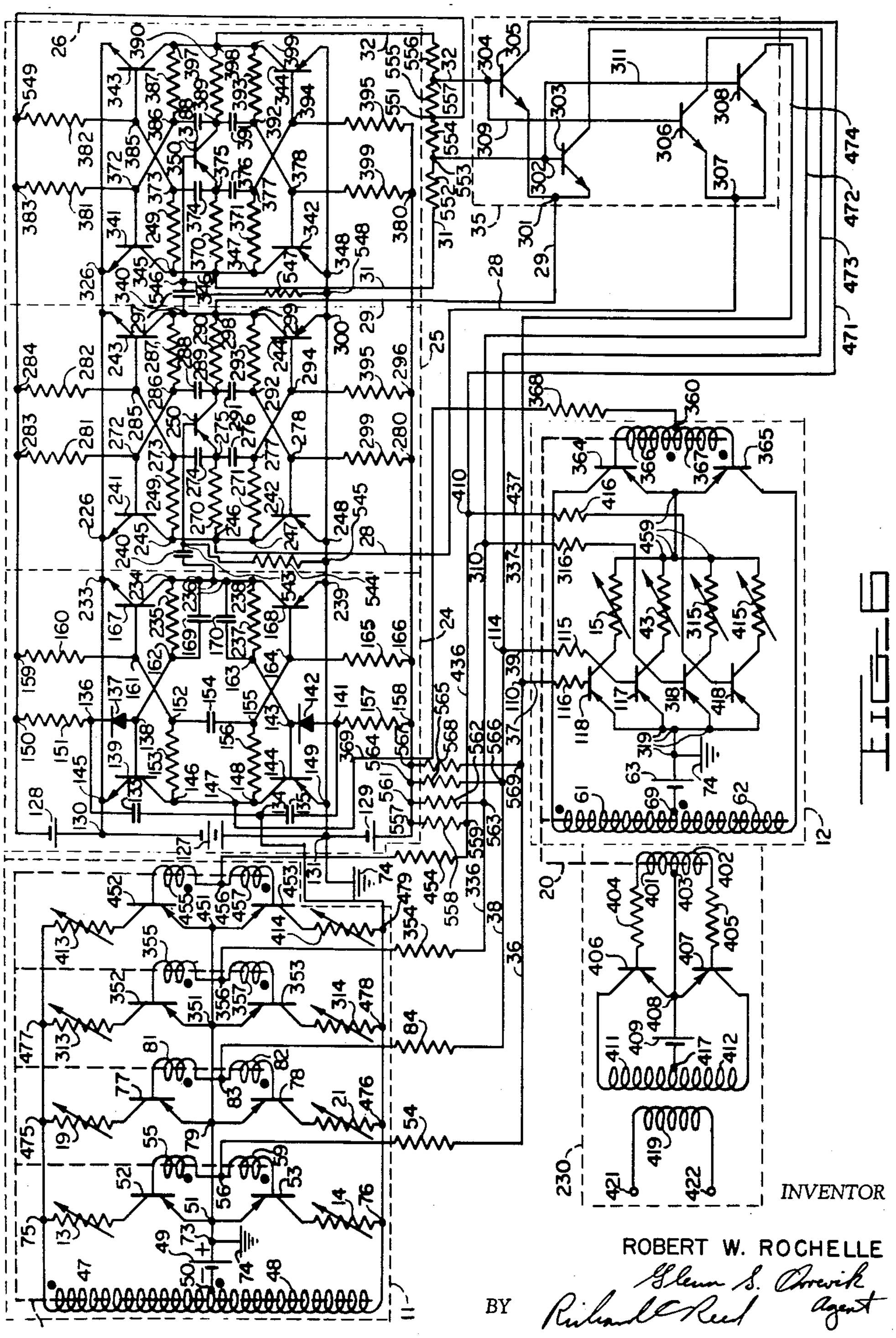
FIG. 6 is a schematic diagram of a twelve channel telemetering system constructed in accordance with the principles of this invention.

The twelve channel telemetering system of FIG. 6 shows four stages in the low frequency oscillator 11 with the output therefrom fed first into pulse shaper 24, then into binary stages 25 and 26, next into commutator 35 and then fed back to trigger the one-at-a-time operation of the stages of the low frequency oscillator 11 and to trigger the one-at-a-time operation of the stages of the high frequency oscillator 12. Low frequency oscillator 11 and high frequency oscillator 12 are shown with four stages, with the output from high frequency oscillator 12 fed into the clipper and modulator circuit 230. The structure of the two oscillators is mere duplication of the structure of FIG. 5. However, the addition of the pulse shaper 24, and the modification of the binary stages 25, as well as its duplicate 26, the addition of the commutator 35 and the showing of the clipper and modulator circuit 230 are structural differences.

An output from low frequency oscillator 11 is taken at point 479 to which also is connected the not dotted end of driving winding 47, 48. This output is applied at point 134 between capacitors 133 and 135 in pulse shaper 24. Capacitor 133 is connected on its other side to junction 150 through junction 136 and resistor 151. Germanium junction diode 137 is polarized so that the lead from the side that is in the direction of the low impedance path as shown in the drawing is connected to junction 136 and the other side of diode 137 to junction 138 to which are connected the base of transistor 137 and junction 162. Also connected to junction 162 are resistor 235 and capacitor 169. The collector of n-p-n transistor 167 is connected to the junction 234, 236 to which are also connected the resistor 235 and capacitor 169. The emitter of transistors 139 and 167 are connected at junction 130, 145 and 233 between series connected power sources 127 and 128. The base of transistor 167 is connected through junction 161, resistor 160, junctions 159 and 150 to the negative side of power source 128. Junction 152 is connected to the aforesaid junction 161 and also to junction 146 through resistor 153 and to junction 155 through capacitor 154. Junction 146 is connected to the collector of transistor 139, to junctions 147 and 148, and to the collector of transistor 144, the emitter of which is connected to junctions 135 and 131 to a common potential 74. At junction 143 are connected to the base of transistor 144, the side of germanium junction diode 142 that is in the direction of the low impedance path, and junction 163. The other side of diode 142 is coupled to input junction 134 through capacitor 135 and junction 141. A positive bias is applied to the side of diode 142 that is in the direction of the high impedance path from power source 139 through junction 414, resistor 157 and junction 158. Connected to junction 163 also are capacitor 170 and resistor 237 which are connected together at their other sides through junctions 236 and 238. P-n-p transistor 168 is connected so that its collector is connected to junction 238, its emitter to junction 239 and common potential 74, and its base is connected to junction 148 through resistor 156, junctions 155 and 164, thus completing the structure of the pulse shaper 24.

A lead 369 is connected from point 147 in the pulse shaper 24, through resistor 368 to center tap 360 in the control winding 366, 367 of high frequency oscillator 12. Another lead is connected from point 236 in pulse shaper 24 to the first binary stage 25 through coupling capacitor 240, junction 543 to the base of p-n-p transistor switch 250. The structure of the binary stages is similar to the structure of the pulse shaper 24 with the exception that the binary stages are modified so as to operate during one of the half cycles of operation of the low frequency oscillator 11 while the pulse shaper operates during both half cycles. There are no junction diodes in the binary stages, the input signal is applied through a steering circuit which includes capacitor 240 and transistor 250 to be supplied to the bases of the n-p-n transistors 241 and 243 and the p-n-p transistors 242 and 244 through coupling capacitors 288, 274, 291 and 276, respectively. Resistors 270 and 290 are provided to connect the steering transistor 250 to output junctions 246 and 298 from which leads 28 and 29 are connected to the commutator 35. The output from junction 297 in the first binary stage 25 which is coupled to the second binary stage 26 through capacitor 340 to steering transistor 350. The structure of binary stage 26 is identical with the structure of binary stage 25 set forth above. The output of stage 26 is applied to the commutator 35 through leads 31 and 32.

As shown in FIG. 6, commutator 35 includes four n-p-n transistors 303, 305, 306 and 308 connected with the outputs of the two binary stages 25 and 26 in such a manner that the outputs of binary stage 25 are applied to the emitters of the four n-p-n transistors in the commutator and the outputs of the binary stage 26 are applied to the bases thereof. Current limiting resistors 552, 554, 555, and 556 are provided in leads 29 and 32 to limit current surges in the outputs of the binary stages. The collectors of the transistors 303, 305, 306 and 308 are connected, through leads 473, 471, 472 and 474, respectively, to junctions 114, 110, 310 and 410, respectively. Also to junction 110 are connected: the center tap 56 of the control winding 55, 59 of the first stage of the low frequency oscillator 11 through lead 36 and current limiting resistor 54; and the base of p-n-p transistor 118 through resistor 116 in the first stage of high frequency oscillator 12. A positive bias is applied from power source 129 through junction 567, resistor 568 and junction 569 to lead 36 to assure proper operation of the control provided by the commutator 35. The other leads 473, 472, and 474 are connected to the respective other stages of the low and the high frequency oscillators 11 and 12 in exactly the same manner that lead 471 is connected to the two oscillators. The high frequency oscillator 12 includes four stages which include switching p-n-p transistors 118, 117, 318 and 418 and transducers 15, 43, 315 and 415, and in which each stage includes one transistor and one transducer connected in series. The four stages are connected in parallel between the power source 63 and junction 459 which is also the junction of the emitters of the two control transistors 364 and 365 of the basic oscillator. The positive side of power source is connected to the common potential 74 through junction 319.

The clipper and modulator stage 230 includes center tapped at 401 winding 401, 402 on core 20 of the high frequency oscillator 12. The ends of center tapped winding 401, 402 are connected through resistors 404 and 405 to the bases of p-n-p transistor 406 and 407. The emitters of the two transistors 406 and 407 are joined at point 408 to which are also connected the center tap 403 of winding 401, 402 and the positive side of power source 409. The negative side of power source 409 is connected to the center tap 417 of winding 411, 412. The opposite ends of winding 411, 412 are connected to the collectors of n-p-n transistors 406 and 407, respectively. Coupled thereto is an output winding 419 with terminals 421 and 422 connected to the ends thereof. The output across terminals 421 and 422 is applied to the transmitter 231 and then antenna 232 as shown in the block diagram of FIG. 2.

To increase the number of channels to be more than twelve, it is desirable to add channels in multiples of three so that one stage can be added to each of the two oscillators simultaneously. An oscillator stage as set forth is defined as including two transducers, two transistors and a center tapped base winding in the low frequency oscillator, and one transducer and one transistor in the high frequency oscillator. It is noted that the addition of a single binary stage allows the doubling of the number of channels that are available in the telemetering system, such as, three binary stages allow for the capacity of twenty-four channels, and four binary stages allow for the capacity of forty-eight channels. Repetition of channels within the capacity is accomplished by paralleling the outputs from the commutator. This reduces the number of transistors needed for the sequential control of the operation of the oscillators since there would be fewer stages in the oscillators than there would be if some of the channels did not include duplicated information.

In the telemetering system as illustrated by block diagram of FIG. 1, and the schematic diagram in FIG. 3, low frequency oscillator 11 includes a magnetic core 10 of square hysteresis loop characteristics with a center tapped at 50 winding 47, and 48 thereon. To better understand the operation of the circuit, it is assumed that core 10 is initially at negative remanence before the application of the power from power source 49. A positive magnetizing force is needed to change the state of core 10 from negative remanence to positive saturation. By convention, positive current entering a dotted end of a core winding induces positive magnetizing force in the core. The negative side of the power source 49 is applied to the junction of windings 47 and 48 which are halves of a single center tapped winding. With the core in a condition of negative remanance, winding 47 is capable of changing the core flux alignment to positive saturation. As set forth above, if the core 10 is initially at negative remanence, application of power from power source 49, the flux alignment of core 10 will change toward positive saturation. A negative potential is induced at the not dotted end of all windings including control winding 55 and such negative potential is applied to the base of p-n-p transistor 52, causing transistor 52 to be in condition to conduct. Current will then flow from power source 49 through junction 51, transistor 52 and transducer 13 and winding 47. Transducer 13 is a variable resistor which causes the available voltage to vary therewith thus lengthing the time required for the core to saturate. This operation is made possible by the property of the square hysteresis loop magnetic core 10 of absorbing a fixed number of volt-seconds in passing from saturation in one direction to saturation in the opposite direction. This property provides that the time of the half-cycle is a function of the applied signal from transducer 13. Upon saturation of core 10, the negative potential available from winding 55 disappears and the kick-back induced by the drop of the flux alignment in core 10 from positive saturation to positive remanence induces sufficient negative potential across winding 57 to cause transistor 53 to conduct, thereby causing the current to flow through the other half of the oscillator. That is, from power source 49 through junction 51, transistor 53, transducer 14, winding 48, junction 50 to the negative side of power source 49. During this half-cycle, the time required to saturate core 10 is a function of the value of the resistance 14. It is seen that the maximum frequency of the low frequency oscillator 11 occurs when the resistive value of transducers 13 and 14 is zero. The frequency is then representative of the magnitude of the power source since the values of all of the other components are relatively fixed. It is noted that biasing resistor 54 connected between junctions 51 and 56 is supplied to provide more exacting control in the circuit.

Winding 58 is wound on core 10 to provide a control signal to high frequency oscillator 12. The structure of the high frequency oscillator differs from the low frequency oscillator in that the biasing across the junction 59 of the emitters of the transistors 64 and 65 and the center tap 60 of the base winding 66, 67 is derived from the output of 58 instead of the base windings themselves. The transducer 15 is placed in circuit between the center tap 69 of winding 61, 62 on core 20 and the negative side of power source 63. This allows the frequency of oscillation of the high frequency oscillator to be a function of the value of the resistance value of variable resistor transducer 15. When the resistance value of transducer 15 is zero, the frequency is at a maximum. However, transducer 15 may be a variable current or a variable voltage and, should the voltage be negative the frequency of the oscillator will exceed the frequency generated by the power source 63 and the input signal from the low frequency oscillator 11.

When the flux alignment of core 10 in the low frequency oscillator is changing from negative saturation to positive saturation, a negative potential is induced at the not dotted end of coupling winding 58 and is applied to center tap 60 through current limiting resistor 68. The positive potential induced at the dotted end of coupling winding 58 is added to the positive potential of power source 63 at junction 59. This is the proper polarization for the operation of the high frequency oscillator 12. Circuit values are selected so as to enable a frequency of an order greater than the frequency of the low frequency oscillator 11. As many as ten, twenty or even one hundred times the frequency of the low frequency oscillator is desirable.

When the flux alignment of core 10 in the low frequency oscillator is changing from positive saturation to negative saturation, a positive potential is induced at the not dotted end of winding 58 and is applied to the center tap 60 and negative potential induced at the dotted end of coupling winding 58 is applied to junction 59. This is the proper polarization for the blocking of the high frequency oscillator 12. Thus it is seen that during one of the half cycles of the low frequency oscillator, the high frequency oscillator is operative and during the other half cycle of the low frequency oscillator, the high frequency oscillator is inoperative.

Winding 124 on core 20 in the high frequency oscillator induces an output signal across output terminals 125 and 126. Such output is shown in FIG. 4 in which pulse length 69 is representative of the time of the positive half cycle of operation of the low frequency oscillator 11 and frequency 72 is representative of the simultaneous frequency of the high frequency oscillator 12. Pulse length 71 is representative of the time of the negative half cycle of operation of the low frequency oscillator and the absence of a frequency representation signifies that high frequency oscillator 12 is inoperative during such half cycle. The second representation of signals 69, 71 and 72 is identical with the first representation to signify that the outputs controlled by the three transducers of the three channel telemetering system of FIGS. 1 and 3 are repeated indefinitely. Should the values of the transducers change from one frame to the next, however, the signals of the two frames will not be identical, but will be representative of such change.

The telemetering system of FIG. 5 shows low frequency oscillator 11 with two stages therein including four transducers 13, 14, 19 and 21, and high frequency oscillator 12 with two stages therein including two transducers 15 and 43. The operation of the six channel telemetering system is the same as the three channel telemetering except that the addition of more transducers requires the addition of control circuit, in this case binary stage 25, to provide for the output across terminals 125 and 126 to include the representation of the outputs of one transducer in the low frequency oscillator and one transducer in the high frequency oscillator alternating with the output of a second transducer in the low frequency oscillator alone. Alternate frequency bursts in the output across terminals 125 and 126 represent the values of alternate transducers in the high frequency oscillator. The pulse time of such bursts represent the values of alternate transducers in the low frequency oscillator, while the time between such bursts represents third and fourth transducer values in the low frequency oscillator. This separation of signals is accomplished by the functioning of the binary counter 25.

In order that the operation of the binary counter 25 will be more clearly understood, it is assumed that the potential at point 92 is positive with respect to the potential at point 93. This requires that p-n-p transistor 103 be conductive and that p-n-p transistor 109 be nonconductive. A positive potential is provided from the positive side of power source 113 through point 112, point 111, transistor 103, points 101, 97 and 92 through lead 28, junction 110. From junction 110, the positive potential is conducted by lead 37 across resistor 116 to the base of the p-n-p transistor 118 causing transistor 118 to be nonconductive, and by lead 36 through resistor 54 to center tap 56 on control winding 55, 57 to the bases of p-n-p transistors 52 and 53 to be nonconductive. The negative potential at point 93 in binary stage 25 is provided by the negative side of the power source 113 applied to point 96 across current limiting resistor 95 to point 93. From point 93, lead 29 conducts the negative potential to point 114 from which lead 39 provides a negative potential to p-n-p transistor 117 across current limiting resistor 115, and from which lead 38 provides a negative potential across current limiting resistor 84 to the center tap 83 of control winding 81, 82 in the second stage of the low frequency oscillator 11. The negative potential on the base of transistor 117 and the negative potential on the bases of p-n-p transistors 77 and 78 supplied through winding 81, 82 causes the transistors to be conductive.

When the flux alignment in core 10 of low frequency oscillator 11 as shown in FIG. 5 starts to change from positive to negative saturation, a positive pulse is induced at the not dotted end of winding 48 and is applied through junction 85, capacitor 86 and junction 87 to the base of n-p-n transistor 88, rendering transistor 88 conductive. Coupling capacitor 86 isolates the alternating current component of the pulse so as to trigger transistors 88 only during the potential rise time at junction 85. The momentary positive pulse across capacitor 86 exceeds the negative bias applied from power source 113 through junction 91 across current limiting resistor 89 and through junction 87 to the base of transistor 88. In the time that transistor 88 is conductive, the positive rise of potential at point 93, 106 causes a positive pulse across capacitor 105 through junction 104 which is applied to the base of p-n-p transistor 103 causing it to be nonconductive. Simultaneously the potential drop at point 92, 97 caused by the conduction through transistor 88 provides a negative pulse across capacitor 98 through junction 99 which is applied to the base of p-n-p transistor 109 causing it to be conductive. During the nonconductive state of transistor 103 and the conductive stage of transistor 109, transistors 52 and 53 in the low frequency oscillator 11 and transistor 118 in the high frequency oscillator 12 are conductive since such transistors are connected to negative potential point 92 in the binary stage 25 and transistors 77, 78 and 117 are nonconductive since such transistors are connected to positive potential point 93 in the binary stage 25.

So it is seen that in the six channel telemetering system of FIG. 5, one stage of the low frequency oscillator 11 and one stage of the high frequency oscillator are operated simultaneously and the operation of the two stages of the two oscillators is in alternation, as controlled by the binary stage 25. During the drop of the flux alignment from positive saturation to positive remanence in core 10, a positive trigger pulse is applied across capacitor 86 to trigger n-p-n transistor 88 to cause the outputs 92 and 93 of binary stage 25 to reverse polarity whereby the inoperative stages become the operative stages and the operative stages become the inoperative stages. Before the drop of the flux alignment in core 10 toward negative saturation, which occurs only once during a complete cycle of oscillation of oscillator 11, coupling winding 58 maintains high frequency oscillator 12 in operative condition during one half cycle of such complete cycle of the low frequency oscillator and causes high frequency oscillator 12 to be inoperative during the other half cycle of such complete cycle. Thus it is seen that the output from output winding 124 across output terminals 125 and 126 contains two frequency bursts which represent the outputs of the transducers 117 and 118 in the high frequency oscillator 12 and pulse lengths of the said frequency bursts represent the outputs of the transducers 13 and 19, all of which are effective only during the positive half cycles of the low frequency oscillator 11. The pulse lengths of the interval between the two said frequency bursts and the second of the two frequency bursts of one frame and the first frequency burst of the next frame represent the outputs of transducers 14 and 21 which are effective only during the negative half cycles of the low frequency oscillator 11.

It is seen that a second high frequency oscillator can be provided to the circuit of FIG. 5 to operate during the negative half cycles of the low frequency oscillator 11 to provide two more channels during the same time. In order that the output of such second high frequency oscillator be intelligible, the oscillator must operate at a different frequency range entirely from the range of frequency of the disclosed high frequency oscillator 12 and such second high frequency oscillator must operate at many times the frequency of the low frequency oscillator 11.

For a graphic showing of the output of the six channel telemetering system of FIG. 5, attention is directed to signals 212, 213, 214, 215, 221 and 222 in line G of FIG. 7. The pulse lengths 212 through 215 are representative of the values of transducer 13, 14, 19 and 21 while the frequencies 221 and 222 are a representative of the values of transducers 15 and 43. Immediately following the completion of pulse time 215, pulse time 212 with frequency 221 would appear in order to repeat the six channel frame of a six channel telemetering system.

As more channels are added to the telemetering system, more controls are required so that the output of the system will contain distinct signals. In the twelve channel telemetering system of FIG. 6, the low frequency oscillator 11 contains four stages in which the outputs of eight transducers 13, 14, 19, 21, 313, 314, 413, and 414 are encoded and the high frequency oscillator includes four stages in which the outputs of four transducers 15, 43, 315 and 415 are encoded. The output of the low frequency oscillator 11 is fed into pulse shaper 24 from junction 479 which is connected to the not dotted end of winding 48 on core 10, and to junction 134 which is connected between capacitors 133 and 134. Since its operation is to modify the formation of the output signal of the low frequency oscillator 11, pulse shaper is operative during both of the half-cycles of the operation of the low frequency oscillator 11. During the change of flux alignment in core 10 of oscillator 11 from negative saturation to positive saturation, the negative potential induced at the not dotted end of winding 48 is provided to the pulse shaper 24 through junctions 479 and 134. The pulse which results from the fall from saturation toward remanence which assures the proper operation of the oscillator 11 also provides the initial pulse to actuate the pulse shaper. When this pulse is negative, unidirectional element 137 is conductive and unidirectional element 142 is nonconductive. The negative potential at junction 138 is applied to the base of n-p-n transistor 139 causing it to be nonconductive. The rise of potential at point 146 causes a positive pulse to develop across capacitor 154 from power source 129 through resistor 165 and junction 155.

The output of low frequency oscillator 11 is taken from junction 479 to which is also connected the not dotted end of driving winding 47, 48 on core 10 and is applied to the pulse shaper 24 at junction 134 which is between capacitors 133 and 135. When the flux alignment in the core 10 falls from saturation to remanence in either of the two polarities, a pulse is applied across capacitors 133 and 135. When the polarity of the pulse is positive, unidirectional element, or diode, 142 is in a conductive state, while unidirectional element 137 is in a nonconductive state. The rise of potential at junction 143 which was caused by the conductivity of diode 142 is applied: to the base of p-n-p transistor 144 rendering it nonconductive; and across capacitors 170 and 169 to the base of n-p-n transistor 139 rendering it conductive. When transistor 139 starts to conduct, the fall of potential at its collector, junctions 146, 147 and 148, across resistor 156, and at junctions 155 and 164 when applied to the base of p-n-p transistor 168 renders it conductive. This negative potential is also applied to the base of n-p-n transistor 167 rendering it nonconductive. So the positive input pulse provides an array such that two diagonally disposed transistors are conductive while the other two diagonally disposed transistors are nonconductive. The negative pulse of the other half of the cycle of the low frequency oscillator output causes unidirectional element 137 to be conductive. The potential on the base of transistor 139 is now negative and, therefore, nonconductive. The fall of potential on the base of transistor 144, which results from the fall of potential across capacitors 169 and 170, switches transistor 144 to be conductive. The rise of potential at junctions 148 and 146 after transistor 144 conducts is applied to the bases of transistors 167 and 168, switching 167 to conduction and 168 to nonconduction. Capacitor 154 balances the circuit values, i.e., the voltages in the branches of the circuit. The diagonally disposed transistors which were just before conductive are now nonconductive and the ones which were nonconductive are now conductive.

It is seen that the polarity at junction 147 between transistors 139 and 144 alternates oppositely with the polarity of the output of the low frequency oscillator 11 so that when the output of the low frequency oscillator is negative, junction 147 is positive. Control winding 366, 367 in the high frequency oscillator 12 is therefore biased so that the high frequency oscillator does not operate. When the output of the low frequency oscillator is positive, junction 147 is negative and the high frequency oscillator will operate. In this manner, the high frequency bursts occur during the positive output of the low frequency oscillator. The system would operate equally well with the occurrence of the high frequency bursts during the negative half cycles of the low frequency oscillator.

In the binary stages 25 and 26, diagonally disposed transistors are simultaneously conductive. That is, in binary stage 25 for example, n-p-n transistor 241 and p-n-p transistor 244 are conductive while p-n-p transistor 242 and n-p-n transistor 243 are nonconductive. Output 28 is negative during this condition of the transistors with respect to output 29. To reverse the polarities of the outputs, it is only necessary to reverse the condition of conductance in the transistors so that the ones which were first conductive are now nonconductive and the ones that were nonconductive are now conductive. This operation is provided in the following manner.

When n-p-n transistor 241 is conductive, a positive potential is required on the base thereof. This is provided by the conductivity of p-n-p transistor 244, for while transistor 244 is conducting, the potential of junctions 299, 298, 297, 286 and 272 are at the same potential as the positive side of power source 127 and the common potential 74 except for the potential drop across current limiting resistor 287. The negative potential needed to cause transistor 244 to be conductive is provided by the fall of potential difference across conducting transistor 241. Junctions 245, 246 and 247 are then at the same potential as the negative side of the direct current power source 127. Junctions 274 and 294 and, therefore, base of transistor 244 are at the same negative potential except for the potential rise across limiting resistor 271. As a result, transistors 241 and 244 are conductive and are locked in such conductive condition by the circuitry just described. Simultaneously, the potential on the base of p-n-p transistor 242 is positive since junctions 278 and 292 are connected across current limiting resistor 293 to junction 299 which is positive since transistor 244 is conducting as set forth above. Also, the potential on the base of n-p-n transistor 243 is negative because of the connection to the negative potential at terminal 245 through current limiting resistor 249 and the junctions 273 and 285. Transistors 242 and 243 are caused to be in a nonconductive stable state. Output 28 is negative and output 29 is positive. It is seen that all of the connections to the bases of all transistors are protected by the inclusion of current limiting resistors between the power and bias sources 127, 128 and 129, and, thereby assuring the proper operation of the transistors.

To reverse the state of the binary stage 25, a trigger circuit is provided which includes the output of the pulse shaper 24 from junction 236 applied across capacitor 240 to the base of p-n-p transistor 250; capacitors 274 and 276 connected at junction 275 to the emitter of transistor 250 and to the bases of the n-p-n and p-n-p transistors 243 and 244, respectively; and capacitors 288 and 291 connected at junction 289 to the collector of transistor 250 and to the bases of the n-p-n and p-n-p transistors 241 and 242 respectively. The base of transistor 250 is usually biased so that transistor 250 is nonconductive by the positive potential from the positive side of the direct current power source 127 applied through junction 545 across current limiting resistor 544 and through junction 543. The output of pulse shaper 24 includes both the positive and the negative half cycles of the oscillations of the low frequency oscillator 11. Since transistor 250 is a p-n-p type, only the negative pulses from the pulse shaper cause transistor 250 to be conductive. However, when the transistor 250 is in conductive condition, current will flow in either direction through the emitter and collector, depending upon the polarities of the circuit.

Upon the receipt at the base of transistor 250 of a first negative pulse from pulse shaper 24, with the transistors locked in the conditions described above; that is, transistors 241 and 244 are conductive and transistors 242 and 243 are nonconductive; transistor 250 becomes conductive and current flows through the emitter and collector thereof because of the potential difference thereacross. The collector is connected across resistor 290 to the positive potential terminal 298 while the emitter is connected across resistor 270 to negative terminal 246. Reversal of the connection of the collector and the emitter of transistor 250 would not alter the operation of the circuit and can be done without modification. Flow of current through transistor 250 provides, during the rise time thereof, a drop of potentials which is applied across capacitors 288 and 291 to the base of transistor 241, rendering it nonconductive and to the base of transistor 242 making it conductive. Such flow of current also provides a rise of potential which is applied across capacitors 274 to the base of transistor 243, rendering it conductive, and to the base of transistor 244, making it nonconductive. The polarities of the outputs 28 and 29 reverse and the circuit operates as described prior to the pulse from the pulse shaper to lock on transistors which were off and lock off transistors which were on.

Output 28 is now positive and output 29 is now negative. The fall to negative of output 29 is applied across capacitor 340 to the base of p-n-p transistors 350 in binary stage 26 to cause a reversal of the polarities of the outputs thereof.

The second negative pulse from the pulse shaper which is applied to transistor 250 causes transistor 250 to conduct. This time the potential drop is in reverse direction through the transistor than that of the first time. The switching of the other transistor in binary stage 25 is accomplished by the pulses across capacitors 274, 276, 288 and 291 as described above except that the polarities are reversed and the reversal of the polarities of the outputs is accomplished. Also, the pulse that is delivered to the second binary stage 26 is positive and, consequently, no change occurs therein.

The number of binary stages is determined by the need to control the operation of a single stage in the low frequency oscillator. Since one binary stage can select which of two stages is to be operative, it follows that for every two stages in the low frequency oscillator, one binary stage is required.

In order to more fully understand the operation of the commutator 35, attention is first directed to the waveforms as set forth in FIG. 7. In FIG. 7, line A represents the output of the low frequency oscillator as applied to the pulse shaper 24. Reference line 171 represents the mean about which the output of the low frequency oscillator 11 varies. Signals 172 through 181 represent the encoded values of the outputs of the transducers 13, 14, 19, 21 and so no as represented in FIGS. 1 and 6. In the operation of the oscillator as discussed before in this specification, the output of the low frequency oscillator is a fixed relationship of pulse length times amplitude because of the property of the magnetic cores used herein absorbing a fixed number of volt-seconds in passing from saturation in one direction to saturation in the opposite direction. It is noted that the area under each of the curves 172, 173, 174, etc., is a constant value. The amplitude, or voltage, multiplied by the pulse width, or pulse time, is therefore, represented as a constant. Since the pulse width conveys the same information that the amplitude reveals, only the pulse width is utilized in this device. As a result, pulse shaper 24 reforms the output signal of oscillator 11 to be a constant amplitude signal as shown in line B of FIG. 7 with the pulse being representative of the variation of the encoded transducer outputs. Binary stage 25 is triggered only by the negatively directed output pulses 183, 187, 191 from pulse shaper 24 and is, therefore, triggered into operation only once during the complete cycle of operation of oscillator 11 and pulse shaper 24, as shown in line C of FIG. 7. The second binary stage 26 is triggered only by the negatively directed output pulses 193 and 197 from the first binary stage 25 and is likewise triggered into operation only once during the complete cycle of operation of its input signal. For each binary stage, two complete cycles of operation of the pulse shaper are required to trigger the complete operation of such binary stage. That is, the first binary stage requires two cycles, 184 through 190 for the operation of one cycle 194, 196, while the second binary stage will complete one cycle of operation 200, 202 only after four complete cycles in the pulse shaper. Line E in FIG. 7 represents the operation of a third binary stage which would be required for more than twelve channels of encoded signals. Line F represents the operation of the last of the such required binary stages. Line G represents the output signal of the system as transmitted from antenna 232 with the pulse lengths 212 through 220 being the same pulse lengths as shown in lines A and B and represent the outputs of the low frequency oscillator 11 while the frequencies 221 through 225 represent the variations of the encoded outputs of the transducers in the high frequency oscillator 12. Frequency 221 is representative of the value of the output of one of the transducers, say transducer 15, in the high frequency oscillator, while 222 represents the output of a second transducer, say 43 and so on. The control of the sampling of the several transducers so as to present the combined representation of only one of the transducers in the high frequency oscillator during the representation of only one of the transducers in the low frequency oscillator and the single representation of another single transducer in the low frequency oscillator between such combined representations is provided by the activity of the binary stages in cooperation with a switching matrix in the commutator 35.

When the output 28 of binary stage 25 is negative, output 29 is positive. Negative output 28 is applied to the emitter of n-p-n transistors 306 and 308. This provides a capability to be conductive in the event a positive potential is applied to the base of either transistor 306 or 308. Such a positive potential is applied to the base of transistor 306 from output 32 through resistor 556, overcoming the negative bias supplied through resistor 555, junctions 551 and 549 from power source 128. Simultaneously, output 31 of binary stage 26 is negative and output 32 thereof is positive. N-p-n transistor 308 is rendered nonconductive by the negative bias and negative output 31 applied to the base thereof. Since output 29 is positive, no potential drop exists across n-p-n transistors 303 and 305 to enable them to be conductive, even though a positive potential is applied to the base of transistor 305. So it is seen, only transistor 306 is conductive when outputs 28 and 31 are negative, and lead 472 connected to junction 310 and the third stage of the low frequency oscillator becomes the means whereby a potential drop can occur so that the said third stages will no longer be biased off, but will become operative. All of the other stages in the oscillators are biased off by the positive potential from power source 120 provided through junctions 569, 563 and 559.

When a first negative pulse is received from the pulse shaper by the binary stage 25, output 28 becomes positive and output 29 becomes negative and binary stage 26 outputs 31 and 32 reverse polarities also. Transistor 306 is rendered nonconductive by the negative potential at its base and the positive potential at its emitter. Transistor 308 remains nonconductive since a positive potential is applied to its emitter. Output 29 is now negative and is applied to the emitter of transistor 303 to which also a positive potential is applied to its base to render transistor 303 to be the conductive transistor. Transistor 305 is maintained in a nonconductive condition because of the negative potential that is applied to the base thereof by output 32. When outputs 29 and 32 are negative, 303 conducts, and lead 473 connected to junction 114 and the second stage of each of the oscillators becomes the means whereby a potential drop can occur so that the said second stages will become operative and the other stages will remain biased off.

Upon the arrival of the second negative pulse from pulse shaper 24 at the binary stage 25, output 28 becomes negative again and output 29 becomes positive again while binary stage 26 is not altered, that is, output 31 is positive and output 32 is negative. This time, only transistor 308 is conductive since it is the only transistor with a negative potential on its emitter and a positive potential on its base. Transistor 308 is connected to lead 474 and to the junction 110 to cause the first stage in each oscillator to be operative while the other stages are biased off. When the third negative pulse from the pulse shaper is applied to the first binary stage, output 28 becomes positive and output 29 becomes negative and binary stage 26 is triggered so that output 31 is negative and output 32 is positive. Transistor 305 is now the only conductive transistor. The collector of transistor 305 is connected through lead 471 and junction 410 to cause the fourth stage of each oscillator to be operative while the other stages are biased off. A fourth negative pulse from the pulse shaper 24 resets the transistors so that transistor 306 is conductive and the cycle begins again.

Since the sequential conductivity of the transistors in commutator 35 provides for the sequential operation of the stages of the two oscillators, it is seen that the encoded outputs of the transducers are distinct and intelligible. In order that the high frequency oscillator 12 is operative only during one half cycle of operation of the low frequency oscillator, control winding 366, 367 is connected through center tap 360, resistor 368, lead 369 and junction 147 to one side of the pulse shaper 24 whereby control winding 366, 367 is biased so as to maintain transistors 364 and 365 in nonconductive condition during one half of the cycle of operation of the pulse shaper 24, which operates synchronously with the low frequency oscillator 11.

An output winding 401, 402 with center tap 403 is provided on the core 20 of the high frequency oscillator 12 and such winding is connected to the clipper and modulator oscillator constructed in accordance with the principles of construction and operation as the other two oscillators of this disclosure. Output winding 419 induces across terminals 421 and 422 the complete telemeter output which is transmitted therefrom to a receiving station.

The cores used in this invention are generally of a solid ferromagnetic saturable material, such as 50% nickel-iron which is commercially available under the trade names "Orthonol," "Deltamax" or "Supermalloy," or it may be made of an alloy of 79% nickel, 4% molybdenum and the balance iron. This material may be in insulated tape form which is wound to form a core.

The p-n-p transistors are known by the number 2N128. The n-p-n transistors are known by the number 2N146. Transistors 250 and 350 should be bilateral, that is, the inverted alpha characteristics should be comparable to the regular alpha characteristics.

Typical frequency ranges for the high frequency oscillator are from 5–15 kilocycles, and for the low frequency oscillator, the half cycle period variation is from 4 to 24 milliseconds, A resistor can be connected across the driving winding 47, 48 to set the proper frequency range thereof.

The telemetering circuit of this invention is included in artificial earth satellites. Such usage is described as follows:

The Lyman-alpha earth satellite has seventeen transducers located on the shell and in the internal package for purposes of measuring parameters such as temperatures, collision with micrometeorites, solar Lyman-alpha radiation, etc. It is the function of the telemetry encoder to take the signal inputs from each of these transducers and encode them for modulation of the Minitrack transmitter. Originally two pounds were allotted to the encoder and batteries for two weeks of interrogated intermittent operation. The first approach was through the use of a mechanical commutator but was discarded because of both weight and bandwidth limitations. By using transistors and magnetic cores in a system having a combination of both frequency and time-sharing modulation, the weight of the encoder unit was reduced to 3.8 ounces and the batteries to 2.8 ounces with an expected life of over a month of continuous operation. The resulting system has a capacity of 48 channels of telemetered information.

The outputs of the satellite transducers are in the form of variable resistances or, as in the case of the Lyman-alpha and the meteorite-collision experiment, in the form of currents or voltages. The encoder takes these currents or voltages and makes the frequencies of tone bursts proportional to them. The length of the "on" time of the burst as well as the time between bursts is proportional to the resistive values of the transducers; thus, three channels are represented by each tone burst. The modulator output, then, is a series of tone bursts lying in the frequency range of from 5 to 15 kc. An example of this output is shown in line G of FIG. 7 in which the frequency of the bursts as well as their "on" and "off" times represents the values for the telemetered channels.

The gates, which determine the lengths of the tone bursts, are generated by means of a timing multivibrator and a transistor matrix. The timing multivibrator in its simplest form is shown in FIG. 3. Two transistors, a square-hysteresis-loop magnetic-core, and two transducers are used to produce a square-wave output. Transistor 52 drives the magnetic core towards positive saturation and 53 takes it to negative saturation by means of the regenerative action of the base winding. Transducers 13 and 14, which might be thermistors or pressure gages, drop the voltage $E_b$ across the core by virtue of magnetizing current flowing through them during each half cycle. This reduced core voltage means that a longer time must be taken before saturation of the core is reached since the flux in the core at any time is the time integral of the voltage across the core. Variations in transducer 13 will cause the length of the positive half-cycles in the output to vary independently of the negative half-cycles, and similarly, variations in 14 will independently change the length of the negative half-cycles. As actually applied, the half-cycle lengths can be varied over a dynamic range of from 5 to 30 milliseconds for transducer resistance changes from zero to five-thousand ohms, even though this dynamic range has been intentionally restricted by installing fixed resistors in parallel with all transducers. The positive half-cycle only is used to gate on a higher frequency square-wave magnetic-core multivibrator. This is termed a tone-burst oscillator.

A system containing only a timing multivibrator which gates on one tone-burst oscillator would be capable of telemetering three channels—one channel for the frequency of the tone burst, one channel for the length of the tone burst, and one channel for the time duration between the tone bursts. Extension of the system to more than three channels is accomplished first by adding to the timing multivibrator as many as six or eight additional base windings on the magnetic core. The center taps to the base windings are each brought out externally and biased so that none of the transistors are turned on. If a negative voltage or gate is applied to center tap 56, transistors 52 and 53 will alternately conduct and transducers 13 and 14 will respectively determine the length of the positive and negative half-cycles in the output. If center tap 83 is energized with a gate after removing the gate from 51, 19 and 21 will control the lengths of the positive and negative half-cycles. Any of the pairs of transducers may be alternately switched in by applying a gate at the proper center tap.

The encoder uses a transistor matrix to supply these sequential gates. The desired action from the gates is to switch gates at the end of every full cycle of the timing multivibrator so that each transducer controls the length of a half-cycle in sequence.

A flip-flop follower and two tandem binary counters count down the cycles of the timing multivibrator. The transistor matrix samples the states of the binary stages and produces a gate which is unique for each combination of the binary states. There are 2 N states so that for example, with four binary stages there are 16 unique states. A separate gate is porduced for each stage, and each gate turns on its own pair of transistors through the center-tapped base winding. The system is a type of ring modulator in that the timing multivibrator drives the binary counters which, through the matrix, form the gates. The gates, however, energize the timing multivibrator, completing the ring.

The flip-flop pulse shaper 24, shown in FIG. 6, is used to remove any loading from the timing multivibrator, and its output is used in an "and" circuit in conjunction with the matrix gates to turn on the tone-burst oscillators or multivibrators during only the positive half-cycles. In the satellite application, a wide bandwidth is needed for the instantaneous Lyman-alpha channel and the solar cell because the readings will be modulated by the satellite roll rate. By paralleling matrix output gates, a group of channels are repeated six times each frame to provide more telemetry time and thereby effectively increasing the channel bandwidth. Four binary stages with sixteen base windings on the timing multivibrator core will normally produce 48 separate channels of information. By paralleling matrix output and using only six base windings, some channels are repeated several times during the 48-channel frame. FIG. 6 shows a schematic of two binary stages and the transistor matrix for 12 channels without paralleling channels.

The binary stages, FIG. 6, are unique in that a transistor replaces the two back-to-back diodes normally used in the steering circuit. The transistor performs somewhat the same function as the diodes; however, the current gain of the transistor is utilized in the triggering. The steering transistor drives the bases of the binary transistors through the capacitive coupling and is decoupled from the low saturation impedance of the "on" transistor by the 3.9K resistor. Half of the time the steering transistor is being used in the inverter-alpha condition, since the binary carries the emitter more negative than the collector. A good percentage of the surface-barrier transistors have betas in the inverted-alpha connection almost as large as in the regular connection. The four-transistor flip-flop or binary connection was used to reduce the total quiescent drain on the batteries. This type of circuit accrues the advantage of high efficiency.

The tone-burst oscillators, which are gated on by the matrix, may be of several different types. It may be a single oscillator type as shown as 12 in FIG. 6 or several individual ones energized by leads equivalent to leads 471 through 474.

The output of the tone-burst multivibrators are added together in parallel to drive the modulation stage. The outputs are decoupled through the use of diodes, since only one multivibrator is gated "on" at a time; there is no interaction between multivibrators. The modulation transistors serve the dual purpose of amplifying and clipping; clipping is utilized to insure 100% modulation of the transmitter. The modulator is shown in FIG. 6. It is powered by a 1.3 volt mercury cell with a drain of slightly over one milliampere. This battery is also used as a bias supply for the binary stages. A portion of a frame of the output is shown in line G of FIG. 7.

The fact that the tone-burst lengths and spaces are functions of the transducer values means that the frame rate is variable, i.e., if the average resistance of the transducers is slow, the frame rate will be fast. More information can be sent per unit time by this system than in conventional systems which allot a fixed time duration for each channel. Since the frame rate is not constant, something about the signal must be unique so that the individual channels may be identified. By putting in a few fixed values of resistance in place of some transducers, a key is formed as well as supplying a means of calibration. One channel length is a 5K calibrating resistor to provide a means of identification. By including a thermistor, the temperature of the magnetic core may be monitored so that a temperature correction for change in magnetizing current may be applied. With the use of the calibrating resistor as a synchronizing burst, a decoder can be built which operates on the same principle as the matrix and binary counters in the encoder.

In a test of this system, an accuracy of better than 1% was attained. The short-term stability or resolution is better than one part in 5000.

So it is seen that the telemetering system of this invention has minimum power supply requirements, a minimum number of components, and minimum weight while requiring a minimum of maintenance. This telemetering system transmits a maximum amount of information by including the representation of the output of two transducers in the length and the frequency in tone bursts and the output of a third transducer during the pulse length between such tone bursts. There is no "clock" to trigger the outputs, but the termination of the output of one transducer provides for the beginning of the output of the next transducer. By proper connection of the transistors of the commutator, channels can be repeated during one frame of information produced by the system. Further, the outputs of the transducers can be in the form of variable resistances, low values of electrical current, higher currents, and of voltages. Finally, the telemetering system of this invention is ideally suited for use in artificial earth satellites.

It is to be observed that the term "encoding" which appears throughout this specification and in the claims is defined as being the effect produced on the output of a generator by the variation of the inputs applied thereto. That is, the change of the pulse length of the output of the low frequency oscillator 11 represents the variation of the output of the transducers connected thereto and measurement of such pulse lengths is, in effect, a measurement of the output of the transducer. The frequency of the output of the high frequency oscillator 12 represents the variation of the output of the transducers connected thereto and measurement of the frequency of the output of the high frequency oscillator 12 is a measurement of the output of the transducer connected thereto. So it is seen that a pulse length of the low frequency oscillator output can be encoded, for example, with a temperature value of a transducer so that a measurement of the pulse length of the output provides a code from which the temperature value is readily decoded.

Obviously, many modifications and variations of the present invention are possible in the light of the above teachings. It is therefore to be understood that within the scope of the appended claims the invention may be practiced otherwise than as specifically described.

What is claimed is:

1. In a switching matrix, a fanout distribution network having a plurality of "$n$" levels in series connection, where "$n$" is an integer, including an input level and an output level, each of said levels having $2^k$ limbs where $k$ is an integer, in said input level $k$ is 1 and in each successive level connected thereto $k$ increases by 1 such that each limb divides into first and second limbs in the next successive level; each of said limbs in each of said levels after said input level including interrupter means with control means therefor; a D.C. voltage source; a plurality of "$n$" binary stages, each of said binary stages including a pair of output terminals, means for applying said D.C. voltage source across said pair of output terminals and means for reversing the polarity of the voltage across said pair of output terminals; periodic means connected to said means for reversing in a first binary stage of said plurality thereof for actuating reversals at selected intervals; means for interconnecting the remainder of said binary stages in said plurality thereof such that each of the means for reversing in each of the last said binary stages is responsive to changes in polarity across the output terminals of a different binary stage; means connecting the remainder of said binary stages in said plurality thereof in successive order to respective successive levels of said network such that the interrupter means in all of said first limbs of each level are responsive to one polarity condition across the output terminals of its respective binary stage and the interrupter means in all of said second limbs in each level are responsive in alternate order to the polarity of the voltage thereacross; and output means connected to each of said limbs in said output level.

2. The device as defined in claim 1 wherein said interrupter means is of the transistor switch variety.

3. The device as defined in claim 1 wherein there are 3 levels in said plurality thereof and 3 binary stages in said plurality thereof.

4. The device as defined in claim 1 wherein said periodic means connected to said means for reversing in a first binary stage of said plurality thereof is of a variety which actuates reversals at regular intervals.

No references cited.